May 22, 1928.
R. E. McGAHEY
1,671,091
GREASE GUN CONNECTION
Filed June 15, 1927
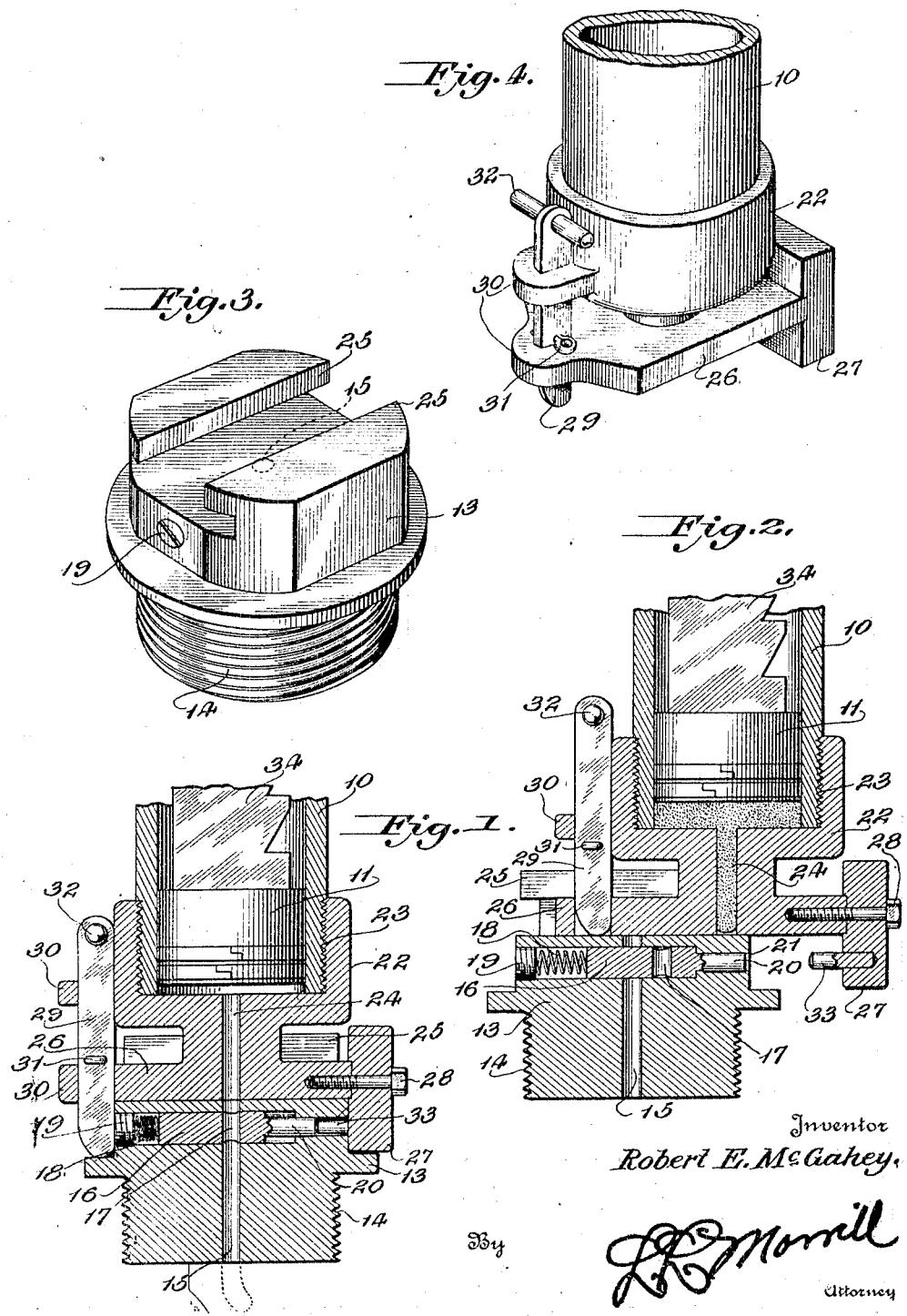
Inventor
Robert E. McGahey,
By
Attorney Patented May 22, 1928.

1,671,091

UNITED STATES PATENT OFFICE.

ROBERT E. McGAHEY, OF ALEXANDRIA, VIRGINIA.

GREASE-GUN CONNECTION.

Application filed June 15, 1927. Serial No. 198,958.

This invention relates to lubricating devices and has for an object to provide a device of the grease gun type specially adapted for the greasing of large bearings, such as connecting rods of locomotives and the like, with improved means for attaching the gun proper to the lubricated member.

A further object of the invention is to provide inter-acting parts of the grease gun and nipple applied to the lubricated device whereby a valve in the nipple automatically closes in normal conditions and is automatically opened by the application of the gun thereto.

A further object of the invention is to provide improved means for maintaining the parts in the united relation while the lubricant is being introduced with the minimum expenditure of time in the releasing of the parts.

With these and other objects in view, the invention comprises certain novel parts, elements, units, combinations, constructions, interactions, mechanical movements and functions as disclosed in the drawings, together with mechanical and functional equivalents thereof as will be hereinafter more fully described and claimed.

In the drawings:

Figure 1 is a diametrical sectional view taken longitudinally through the valve structure.

Figure 2 is a diametrical sectional view taken on the same plane as Figure 1 but with the parts only partially coupled.

Figure 3 is a perspective view of the nipple.

Figure 4 is an enlarged perspective view of the lower end of the gun showing the unit for interconnection with the nipple.

Like characters of reference indicate corresponding parts throughout the several views.

The improved lubricating device which forms the subject matter of this application comprises a cylinder 10 into which the lubricant in the form of grease or the like is introduced with a follower 11 for forcing the lubricant out of the cylinder and through the mechanism hereinafter described.

To accomplish the result, the journal bearing to be lubricated is permanently provided with a nipple indicated at 13 which is attached to the journal in any approved manner, screw threads 14 being shown as a convenient and ordinary means of attachment.

The nipple 13 is provided with a duct 15 communicating directly with the journal bearing, which said duct is interrupted by a slide valve 16 having a port 17 which at times is adapted to register with the duct 15 and at other times to be out of register to close the duct. The closing of the valve is accomplished automatically by a spring 18 which is inserted into the nipple at the back of the valve member 16 and is held in operative position in any approved manner as by the screw plug 19. The valve 16 also is provided with a stud 20 which operates in a reduced guideway 21 in the nipple. The open position of the valve 16 is shown at Figure 1 and the closed position is shown at Figure 2.

Co-acting with the nipple is a unit indicated as an entirety at 22 secured to the normally lower end of the cylinder 10. This attaching to the cylinder may be in any approved manner and by the use of any approved means, but a screw thread attachment 23 is shown, this being a preferred form so that the unit 22 may be bodily removed from the cylinder 10 for the purpose of filling the cylinder with the lubricant. This unit 22 is provided with a duct 24 communicating with the interior of the cylinder and also properly proportioned to register with the duct 15 of the nipple when in operative position as indicated at Figure 1. The connection between the unit 22 and the nipple 13 may be of any usual and ordinary type but preferably a dove-tail connection as indicated by the overhanging ribs 25 of the nipple co-acting with the plate-like section 26 of the unit 22. When this form of connection is employed, the device is united by sliding the plate-like member 26 into the nipple under the overhanging ribs 25, such movement being indicated at Figure 2 with its completed position shown at Figure 1. A stop 27 is provided which is secured to the plate 26 in any approved manner as by the bolts 28, and the united parts are held in such united relation by means of a detent 29, slidably mounted in ears 30 in the unit 22. A limiting pin 31, here shown as a cotter pin, is introduced between the ears 30 and a bar 32 is provided for manually actuating the detent 29 and also acts as a means for preventing loss of the detent 29 from the unit 22.

The stop 27 carries a pin 33 properly positioned to enter the reduced opening 21 as the unit 22 is manually forced from its inoperative position as shown at Figure 2, thereby pushing back the valve 16 against the tension of the spring 18 until the port 17 registers with the conduit 15. This being accomplished, the parts are in the relation shown at Figure 2 and the device is ready to operate.

In the utilization of the apparatus, the organization to be lubricated will be provided at its several journals with nipples of the type shown at 13 and a single gun embodying the cylinder 10 and the unit 22 will serve to lubricate all of such journals by being attached in turn to the several nipples. The gun may, of course, be retained at a central location or in the case of a locomotive for instance may be carried upon the device when lubricating becomes necessary. However this is handled, the gun will be attached to the nipple when and if necessary by first lifting the detent 29 manually, sliding the unit into engagement with the nipple, whereupon the pin 33 will open the valve 16 and the follower 11 will be forced downwardly by any appropriate form of mechanism, forcing out the lubricant through the conduits 24 and 15, passing through the port 17. When the device is removed from the nipple, the spring 18 automatically closes the opening to the journal by forcing the valve 16 to the position shown at Figure 2. The opening and closing of this valve is, therefore, entirely automatic with the application of the gun to the nipple.

What I claim to be new is:

1. A lubricating organization comprising a nipple having a conduit, a valve slidably mounted in the nipple and provided with a port adapted at times to register with the conduit, a spring adapted to hold the valve with the port normally out of register with the conduit, a lubricating member comprising a part having sliding engagement with the nipple, and means carried by the lubricating member for automatically opening the valve when slidably moved to operative position.

2. A lubricating organization comprising a nipple having a conduit, a valve slidably mounted in the nipple and provided with a port adapted at times to register with the conduit, a spring adapted to normally hold the valve with the port out of register with the conduit, a lubricating member having a conduit adapted to register with the conduit of the nipple, dove-tailed interconnecting means between the lubricating member and the nipple, and means carried by the lubricating member for automatically moving the valve against the tension of the spring when the lubricating member is coupled with the nipple.

3. A lubricating organization comprising a nipple having a conduit, a valve chamber intersecting the conduit, a valve slidably mounted in the valve chamber and having a port adapted to register at times with the conduit, a spring positioned to hold the valve with the port normally out of register with the conduit, a lubricating member having means for sliding interconnection with the nipple, means carried by the lubricating member to normally move the valve against the tension of the spring to register the port with the conduit, and manual means for locking the lubricating member and nipple together.

4. A lubricating organization comprising a nipple having a conduit, a valve mounted to slide and to open and close the conduit, overhanging ribs formed upon the nipple, a lubricating member having a part properly proportioned to slide under the overhanging ribs and provided with a conduit properly positioned to register with the conduit of the nipple, means carried by the lubricating member for normally opening the slide valve when the parts are assembled, and a sliding detent carried by the lubricating member adapted to lock the lubricating member in operative engagement with the nipple.

5. A lubricating organization comprising a nipple having a conduit, a valve intersecting the conduit and provided with a port adapted at times to register with the conduit, a spring adapted to normally hold the valve with its port out of register with the conduit, a lubricating device structurally arranged for sliding interconnection with the nipple and having a conduit adapted to register with the conduit of the nipple when the parts are assembled, and a pin carried by the lubricating member adapted to engage and move the valve against the tension of the spring to register the port with the assembled conduits.

In testimony whereof I affix my signature.

ROBERT E. McGAHEY.